US007660401B2

(12) United States Patent
Gamble (10) Patent No.: US 7,660,401 B2
(45) Date of Patent: Feb. 9, 2010

(54) METHOD AND SYSTEM FOR CONTROLLING THE FUTURE BEHAVIOR OF DEVICES AT A REMOTE LOCATION

(76) Inventor: Oliver Wendel Gamble, 436 E. 75$^{th}$ St., New York, NY (US) 10021

( * ) Notice: Subject to any disclaimer, the term of this patent is extended or adjusted under 35 U.S.C. 154(b) by 184 days.

(21) Appl. No.: 11/590,476

(22) Filed: Nov. 1, 2006

(65) Prior Publication Data
US 2007/0168474 A1  Jul. 19, 2007

Related U.S. Application Data

(60) Division of application No. 09/803,257, filed on Mar. 9, 2001, now Pat. No. 7,194,072, and a continuation-in-part of application No. 09/552,711, filed on Apr. 19, 2000, now Pat. No. 7,068,776.

(51) Int. Cl.
*H04M 11/08* (2006.01)
(52) U.S. Cl. .................... 379/102.03; 379/142.14; 709/217; 709/223; 709/230; 713/320

(58) Field of Classification Search ............ 379/102.03, 379/142.14; 700/2; 713/168, 320; 709/217, 709/223, 230
See application file for complete search history.

(56) References Cited

U.S. PATENT DOCUMENTS

| 5,748,716 | A | * | 5/1998 | Levine | 379/102.03 |
| 5,915,026 | A | * | 6/1999 | Mankovitz | 713/168 |
| 6,256,378 | B1 | * | 7/2001 | Iggulden et al. | 379/102.03 |
| 6,324,270 | B1 | * | 11/2001 | Lund | 379/142.14 |
| 6,629,145 | B1 | * | 9/2003 | Pham et al. | 709/230 |
| 6,715,088 | B1 | * | 3/2004 | Togawa | 713/320 |
| 7,072,945 | B1 | * | 7/2006 | Nieminen et al. | 709/217 |
| 7,099,934 | B1 | * | 8/2006 | Ewing et al. | 709/223 |

* cited by examiner

*Primary Examiner*—Gerald Gauthier (57) ABSTRACT

A method and system for enabling users to remotely activate a device using a router. The router may be accessed by communication over one or more networks including, but not limited to, the internet, wireless networks, cable networks, etc. A user accesses an emitter of the user's router and, using transmitted DTMF tones, controls the device.

21 Claims, 9 Drawing Sheets

RINGING
FIG. 5A

ANSWER
FIG. 5B

DIALING
FIG. 5C

FIG. 6

METHOD AND SYSTEM FOR CONTROLLING THE FUTURE BEHAVIOR OF DEVICES AT A REMOTE LOCATION

This application is a divisional of Ser. No. 09/803,257, now U.S. Pat. No. 7,194,072, filed Mar. 9, 2001, entitled "Method and system for remotely accessing and controlling remote devices," herein incorporated by reference in its entirety and is a basis for priority. This application is also a continuation-in-part of Ser. No. 09/552,711, now U.S. Pat. No. 7,068,776, filed Apr. 19, 2000, entitled "Method and system for routing calls to desire discount telephone services," herein incorporated by reference in its entirety and is a basis for priority.

FIELD OF THE INVENTION

The present invention relates generally to a method and system for accessing and controlling devices via remote control over communication systems, and more particularly to a method and system for controlling media recording using the telephone, internet or cable.

BACKGROUND OF THE INVENTION

Often, individuals wish to view a program which requires users to set a media recorder to record the desired program or to contact another person to record the program on a user's behalf. The result is that viewers may miss out on programs that they would like to see because they lack the time to actually view the program, did not set their recorder to record the program, or could not get another person to record the program for them.

Various methods and systems exist for the recording of media, be it media in the form of conventional television, cable, Internet or satellite. The media can be recorded on tapes (e.g., VCR), digital storage sit on top boxes (e.g., TiVo) and hard disk or compact disk storage system. If there is no method of communicating with the storage device via remote access, then there is a lack of opportunity to record interesting media if user is away from the recording device.

SUMMARY OF THE INVENTION

The present invention allows users to remotely set their media recording devices for programs that they want to see, event if no one is in the same location as the recording device. This is accomplished by accessing an enhanced automatic router unit that is in communication with any device that may recognize an incoming call (e.g., answering machine, modified caller ID box, etc.).

The present invention is part of a system/method that allows users to contact a central site and leave instructions for their media recording devices. In one embodiment, users may be signed up purchasers of registered remote units.

The remote user can contact the central site via any Internet accessing device, phone (wire/wireless), fax, etc. The user may then supply requested information to enable the central site to access and set the user's recording device. The enhanced automatic router (EA router) may be attached to a modified Caller ID Box, a phone line with a standard answering machine, a computer, a cable line, etc. The media recording device can be one of a variety of media storage devices including, but not limited to, tape (e.g., VCR), digital (e.g., TiVo), laser (write-able compact disk), etc.

DETAILED DESCRIPTION

System of the Invention

Figure 1:
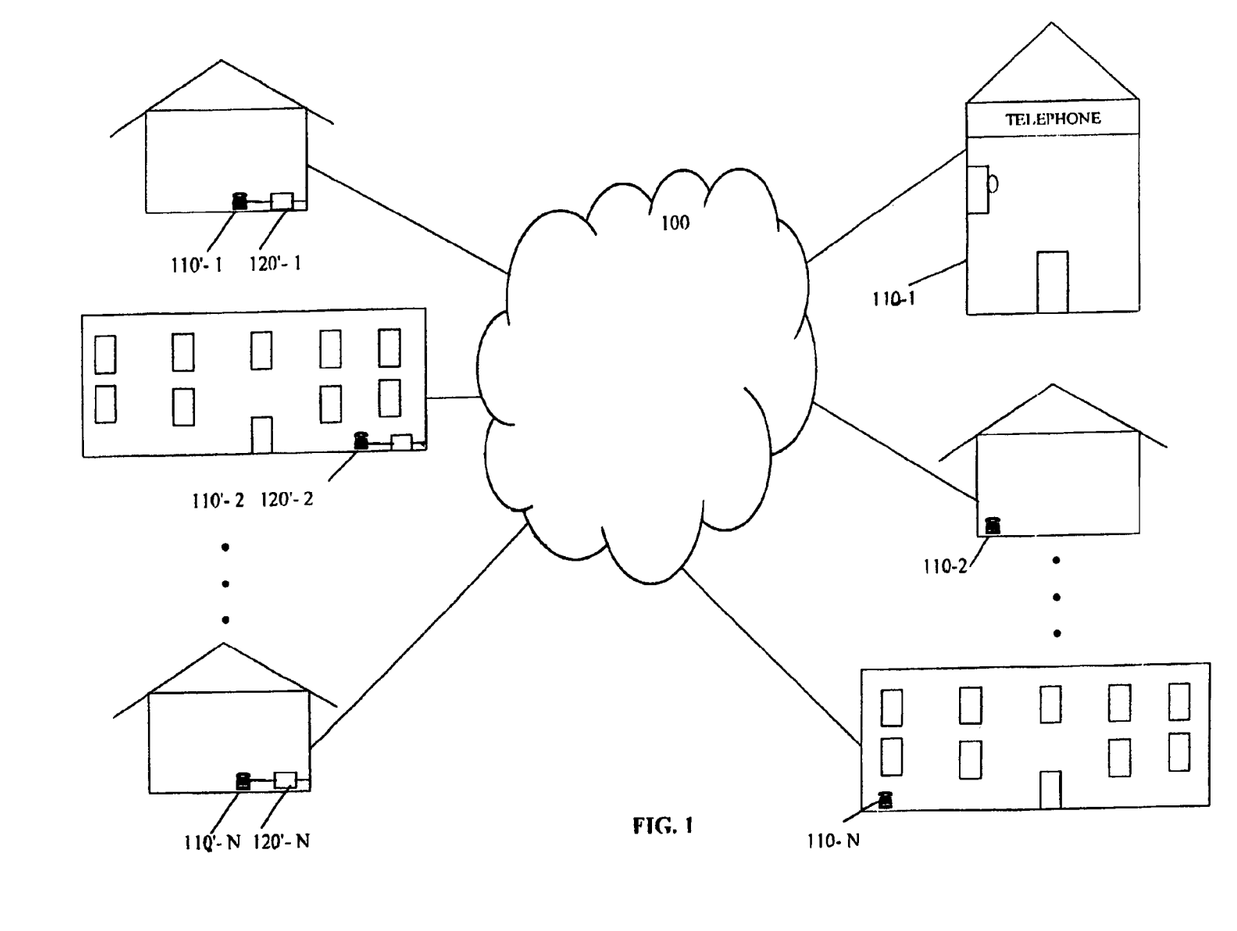
FIG. 1 illustrates a system according to one embodiment of the current invention.

FIG. 1 shows one embodiment of a system incorporating the present invention. In this embodiment, the system includes telephones or user interface devices 110 and 110'. Although the interface user device, in one embodiment, is a telephone, in an alternate embodiment, user interface devices 110 and 110' may be a facsimile, computer, online access device, voice response unit or the like. It should be noted that although references are made herein to telephones and user interface devices, these terms are used interchangeably and may include the other user interface devices listed above, as well as those that are not listed herein, that utilize telephony services to effectuate communication over network 100. It should be noted that the difference between user interface devices 110 and 110' is the devices' connection with automatic router 120 which is described in detail below (i.e., 110' denotes that the device is connected to router 120, while 110 has no such router 120 connected to it).

As shown in FIG. 1, user interface devices or telephones 110 and 110' are connected to a network 100. Network 100 in one embodiment is a public switched telephone network (PSTN). In an alternate embodiment, network 100 may be the internet, world wide web or any network capable of effectuating long distance telephony communications between users. The network enables any one of the interface user devices 110 and/or 110' to be in communication with any of the other user interface devices 110 and/or 110'.

As shown in FIG. 1, some of the interface user devices 110 are connected to an automatic router 120 which may be situated between the telephone 110 and the port (i.e., wall socket) into which the telephone 110 is plugged. As will be described below with reference to FIGS. 3-5, router 120 enables users having such device to automatically make discount telephone calls (or telephone calls). It should be noted that while telephone 110 and automatic router 120 are shown as two separate devices, router 120 may be attached to, located within, or otherwise in communication with telephone 110. Finally, although users seeking to utilize discount long distance services are typically residential or non-commercial users, the scope of the system and method described herein are not limited to such use. Thus, the method and system described herein may include residential telephone users as well as commercial telephone users. Finally, it should be noted that the method and system described herein enable users to recognize discounts when placing potential discount calls. Discount calls are defined as long distance or international calls, and, in some cases, local calls. Because long distance carriers offer local telephone service, and vice versa, a discount telephone service provider may offer discounted service for international service calls, long distance calls, local calls, or any combination of these call types.

Automatic Router

Figure 2:
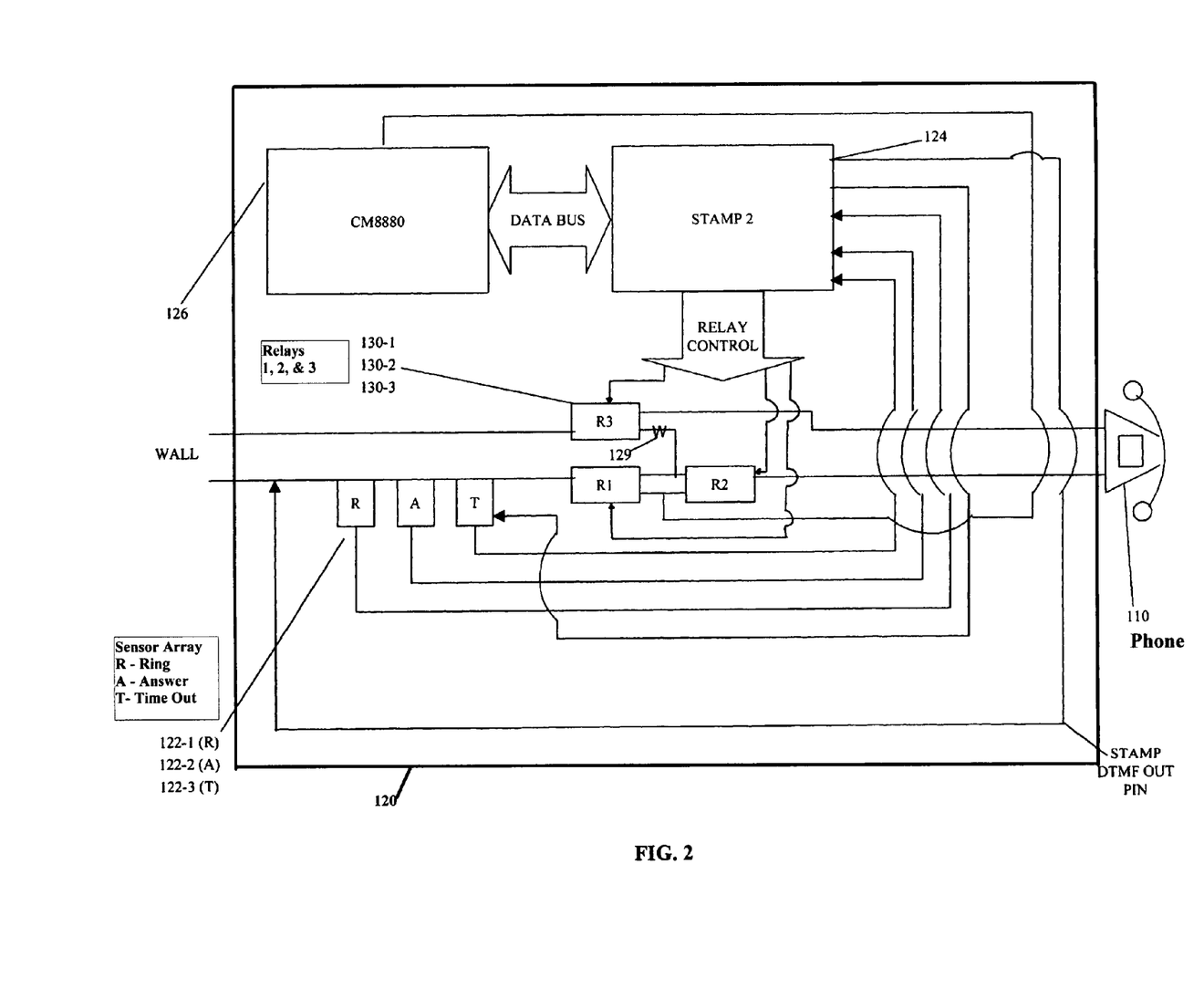
FIG. 2 illustrates one embodiment of the router used in the system shown in FIG. 1.

FIG. 2 illustrates one embodiment of the router 120 used in the system shown in FIG. 1. The main components of the automatic call router 120 are a sensor array 122, relays 130, stamp 124 (containing a microprocessing unit, EEPROM, clock and RAM memory), DTMF (Dual Tone Multi-Frequency) decoder and encoder chip 126, a 2 kilo-ohm @ 5 watt resistor 129, voltage regulator and a power supply. The automatic router 120 may be interposed between and in communication with the telephone or user interface device and the network as shown in FIGS. 1 and 2.

The sensor array 122 may consist of the following three sensors: ring sensor 122-1, an answer/off hook sensor 122-2, and a time out sensor 122-3. These sensors will be termed the R.A.T. for ringing, answering incoming call/off hook status of phone, and time out.

The ringing sensor 122-1 comprises an alternating current optoisolator coupler. The coupler may be attached to the phone line by a reverse facing diode, allowing only negative current to flow through the diode and the trigger of the coupler. Ringing is a process that employs both positive and negative moving current. The reverse facing diode allows only the negative current to reach the coupler. The light emitting diode inside the coupler, in one embodiment, activates a photo-transistor. The photo-transistor allows current to flow through it to a pin on the microprocessor. The microprocessor detects the current as a high signal, indicating ringing of the phone.

The answering/off hook sensor 122-2, comprises an alternating current optoisolator coupler. The coupler is attached to the phone line by a forward facing diode, allowing only positive current to flow through the diode and trigger the coupler. When the phone 110 is off the hook, current flows through the phone line to the coupler. The light emitting diode inside the coupler activates a photo-transistor. The phototransistor allows current to flow through it to a pin on the microprocessor. The microprocessor detects the current as a high signal, indicating the off hook status of the phone.

The time-out sensor 122-3, in one embodiment, is comprised of an alternating current optoisolator coupler and a triac. The coupler is attached to the phone line with leads coming from both the ring and answering sensors. When the phone 110 is off the hook, current flows through the phone line to the coupler. The light emitting diode inside the coupler activates a photo-transistor. The photo-transistor allows a signal current to flow through it to a pin on an optoisolator triac. The triac is activated by a signal from the microprocessor. The phone line signal is directed to the relays. The microprocessor sends a one time activation signal to the triac after it has determined that the phone 110 is off the hook to make an outgoing phone call. This late activation prevents the time-out sensor from falsely reading the ringing or answering incoming call. While the phone is off the hook, the triac will pass a current through a photo-transistor to the microprocessor. The triac will continue to pass current and maintain the high pin state until a circuit break occurs, resulting in a momentary drop in current (and voltage) followed by a resumption of current (and voltage). The microprocessor sends a signal to activate the triac each time the power flowing through it is momentarily halted. The high signal on the time-out pin is turned off. This continues until the triac is reactivated. The triac is activated once per outgoing telephone call. The absence of a high on the pin attached to the triac indicates expiration of the allotted time.

The optoisolator couplers employed, in one embodiment, is part number H11AA814AQT-ND or H11AA814QT-ND manufactured by Optoelectronics. The optoisolator triac may be part number MOC3010QT-ND also manufactured by Optoelectronics. Of course, other components and/or configurations may be used for accomplishing such monitoring.

The relays 130 used in one embodiment of the router 120 have both a normal close circuit and a normal open circuit. The application of a current to the coil will cause the normally open circuit to close, and the normally closed circuit to open. The default state (no power applied to the coil) allows a telephone call to pass through the automatic call router 120. When a current is applied to the coils of relay 1 (R1) 130-1 and relay 2 (R2) 130-2, an alternate path is opened, one that routes the phone line to the DTMF encoder/decoder 126. This re-routing of the phone line allow the microprocessor to monitor/read DTMF tones originating from the phone 110. The microprocessor initiates the monitoring for DTMF tones whenever it detects an outgoing call via the sensors 122. The signal from the microprocessor activating the relay designated relay 2 (130-2) also activates an optoisolator linking the phone line to a common ground, enabling the microprocessor to read the DTMF digits. The microprocessor activates the third relay (R3) 130-3 when it detects a one ("1") as the first DTMF position passing down the telephone line. Although detection of the number "1" as the first DTMF position activates relay 3 (130-3) and deactivates relay 1 (130-1) in the present embodiment, different number(s) and/or different DTMF position(s) may activate relay 3 (130-3) and deactivates relay 1 (130-1). Once relay 130-3 is triggered and relay 130-1 is deactivated, the phone 110 is isolated, and the phone line is seen as being busy to the outside world.

The signal that activates the third relay 130-3 may also activate an optoisolator. This optoisolator provides power needed to allow the phone 110 to continue functioning. When relay 3 (130-3) is activated, a 2 kilo-ohm resistor which is connected across the incoming line from the wall enables the system to emulate that the phone 110 is busy. In one embodiment, the relays 130 used are part # G6E-134P-ST-US-DC5 made by Omron. Of course, other components and/or configurations may be used for accomplishing such control over the telephone line wiring.

A stamp 124 is employed by router 120 and comprises a PIC-micro-controller chip (microprocessor), PBasic interpreter chip (software language use to program the microcontroller), EEPROM (electrically erasable programmable read only memory), RAM (Random Access Memory), clock and ports through which information and instructions can be passed. In this embodiment these ports are called pins, and each pin may be in either a high or low state. The microcontroller uses the state of the sensor pins to monitor the phone line for activity. The sensors 122 are attached to specific pins on the micro-controller, and when these pins go high or low, the micro-controller via the program store in its memory, can determine what is happening. The micro-controller is able to detect an active phone state by monitoring the pin connected to the "A" (answer/off hook sensor). The relays 130 used in the router 120 are attached to specific pins of the micro-controller. The micro-controller recognizes which pin is attached to which relay 130, and the program tells the micro-controller when each relay should be employed. The micro-controller can activate a specific relay by outputting a small voltage to the pin attached to that relay coil. When the pin goes high the relay 130 is activated, and when the pin goes low the relay 130 is de-activated. In one embodiment a stamp II 124 manufactured by Parallax Inc./Microchip Technology (part # PIC 16C57) is used. Of course, other components and/or configurations may be used for accomplishing such control and monitoring of telephone line activity.

The CM8880 126 is a fully integrated DTMF transceiver. This transceiver 126 may be interfaced with a computer/microprocessor to detect and interpret DTMF signals. The transceiver 126 is attached to the telephone 110 via the alternate path created when the relay 1 (130-1) and relay 2 (130-2) are activated. By placing the transceiver 126 connection on the alternate path of the phone line, it is protected from the high voltage of a phone ringing. The phone ring consists of both forward and backward flowing (AC) current at a voltage level that could otherwise damage the transceiver 126.

Once the microprocessor detects an outgoing call state, it triggers the relays 130 that bring the transceiver 126 in contact with the phone line. This will enable the transceiver 126 to interpret the DTMF tones on the phone line, and pass it to the microprocessor. Although the current embodiment employs a CM8880 DTMF transceiver made by California Micro Devices (part # CM8880PI), other components and/or configurations may be used for accomplishing such decoding and encoding of DTMF.

A standard 9 volt and a standard 5 volt regulator may be employed as a power source for the router 120. The 5 volt supply may be used to power the DTMF transceiver 126, the relays 130, the sensors 122 to signal the microprocessor and the stamp 124. The 9 volt source powers the isolated telephone 110. The 5 volt and 9 volt regulators used by the router 126 may be, in one embodiment, Japan Radio Company part # NJM7809-FA and NJM7805-FA, respectively. Of course, other components may be used for accomplishing such regulation of voltage.

Modified Automatic Router

Figure 2A:
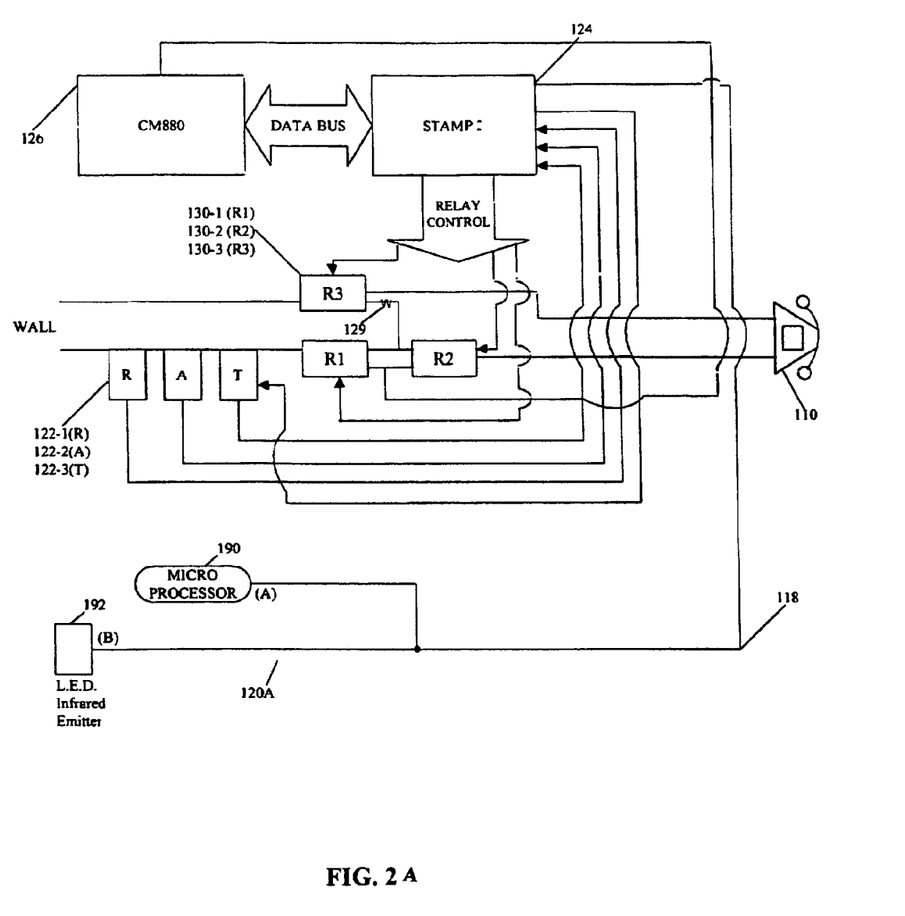
FIG. 2A illustrates another embodiment of the router (EA router) used in the system shown in FIG. 1.

FIG. 2A discloses automatic router 120A which has many of the same components as, and largely function similarly to, the router 120 of FIG. 2. In one embodiment, the router 120A is the same as router 120, except that it can communicate with an external device via light, electrical signals, etc. Router 120A can mimic a remote control device via infrared lights signals (by, e.g., infrared emitter 192), or via a wire connecting it to microprocessor 190 inside a recording device.

It should be noted that, in another embodiment, the functionality of stamp 124 can be divided into two separate but linked microprocessors. The EA router 120A may be in communication with the user's answering machine or some other remote user interface device accessible by a telecommunication system.

In one embodiment, the EA router 120A works by mimicking a manufacturer-supplied remote control. This remote control device can, for example, take the form of a hand held light emitting device or a wire—attaching the router 120A to a microprocessor controlling the external device (e.g., TiVo sit on top box).

In one embodiment, the EA router 120A works by mimicking. The infrared emitter 192 (FIG. 2A) component of the EA router 120A can mimic the manufacture's remote control device code signals. This enables the user to key in instructions from a remote site and have the EA router 120A act as their proxy in issuing instruction to their recorder.

In an another embodiment the EA router 120A may be physically connected to the recording device by a wire that jacks into both units. The EA router stamp 124 (FIG. 2A), may send a series of electrical impulses through a connecting wire to a micro-controller in the recording device. The micro-controller 190 (e.g., PIC 16C63 from Microchip, Inc.) in the recording device (FIG. 2A) converts the stamp 124 communicated data into instructions for recording a desired program. This enables the user to key in instructions from a remote site and have the EA router 120A act as a proxy in issuing instruction to their recorder.

Automatic Routing Process

The process of automatic router 120 may be segmented into three functions: (1) monitoring the telephone line for activity; (2) detecting whether a potential discount telephone call is placed; and (3) placing such call at a discounted rate when such rate is available. These processes are described below in detail with reference to FIGS. 3-5 as well as the components illustrated in FIG. 2.

Phone Line Monitoring Process

The phone lines between the wall and the telephone 110 may be comprised of two wires. In one embodiment, the optoisolator of the "A" (answer/off hook) sensor 122-2 and "R" (ringing) sensor 122-1 are arranged in parallel with the telephone 110 red wire coming from the wall socket. The optoisolator of the time out sensor 122-3 is arranged in series with "A" (answer/off hook) sensor 122-2 and "R" (ringing) sensor 122-1. This allows the sensors to monitor phone line activity. In one embodiment. the phone line which the sensors are monitoring is connected to relay 1(130-1). The optoisolator coupler of the time-out sensor 122-3 is connected to Relay 1 (130-1). Relay 1 is connected to relay 2 (130-2), and relay 2 is connected to the telephone 110. Relay 3 (130-3) is attached to the other wire in the line coming in from the wall and going to the phone 110. In this embodiment relay 3 (130-3) is attached to the green wire. The sensors are attached to the red wires.

Figure 3A:
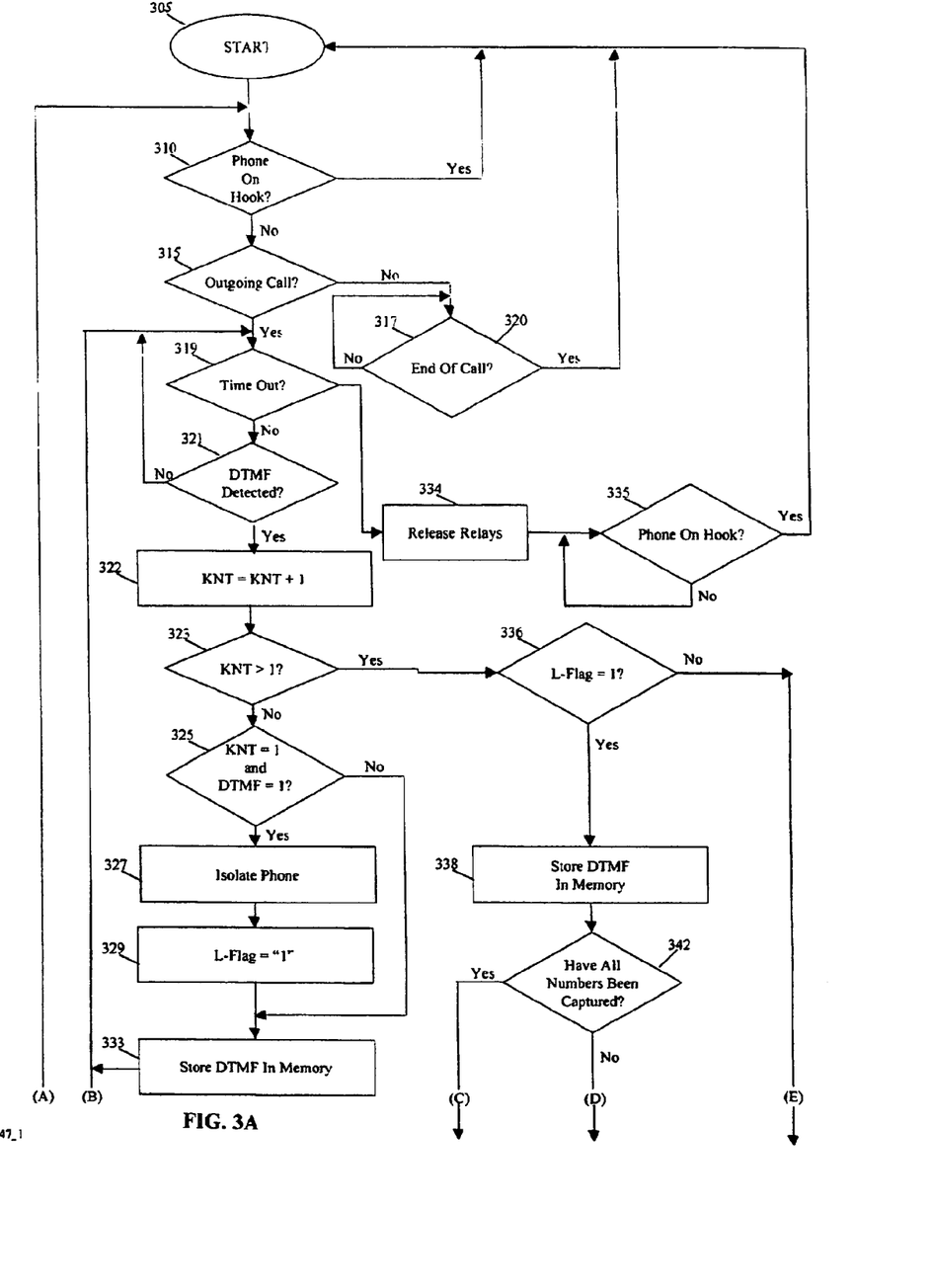
FIGS. 3A and 3B are flowcharts showing telephone line monitoring, discount call detection and call completion processes performed by the router shown in FIG. 2.

Referring to FIG. 3, the automatic router 120 uses a sensor array 122 to monitor the telephone line for activity (i.e., ringing of the phone, answering an incoming call, or initiating a outgoing call) (steps 305 and 310). In FIG. 2 the sensor array 122 is denoted as 122-1 (ring), 122-2 (answer/off hook), and 122-3 (time out)—R.A.T.

The "A" (answering/off hook) sensor 122-2 is connected to the stamp 124 at a pre-determined pin. While this pin remains in a low state, the stamp 124 recognizes that the phone 110 is still on the hook (phone is inactive). The telephone 110 is considered active when it is ringing, being answered, or being used to make an outgoing call. When the phone is active the pin for the "A" (answer/off hook) sensor 122-2 is high.

Figure 5A:
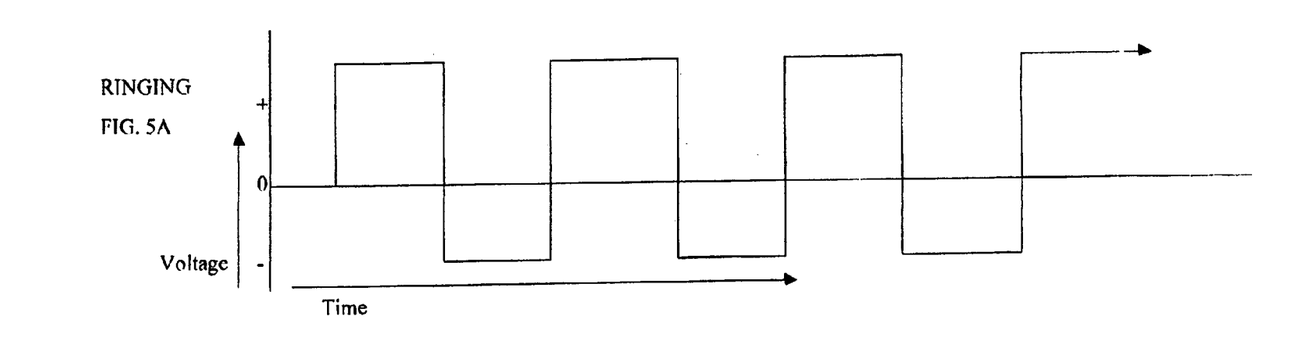
FIG. 5 is a chart illustrating the various signals detected by the automatic router shown in FIG. 2 as it monitors the phone line for activity.

Upon detecting a high state on the "A" (answer/off hook) sensor pin, the stamp 124 utilizes software to determine the exact nature of the phone active state. The stamp 124 briefly polls the pins for both the "R" (ringing) and "A" (answering) phone sensors. A polling cycle may vary, for example, from 0.3 to 0.6 seconds. The stamp 124 monitors the telephone line for activity that is specific to each of the three possible activities (FIG. 5). If the active state is the result of a ringing condition, the alternating (negative and positive flowing) current will appear as only the bottom portion of FIG. 5A. The reverse diode allows only the negative portion of the ring pattern to be detected. The pattern continues as long as the phone is ringing, and the stamp 124 experiences a series of periodic highs on the "R" (ring) sensor pin.

Figure 5B:
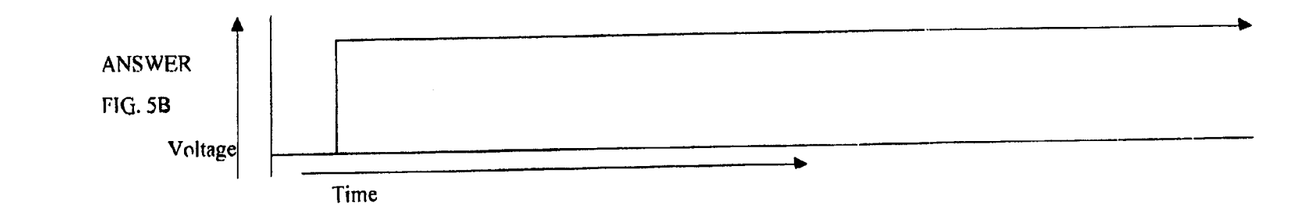
Figure 5C:
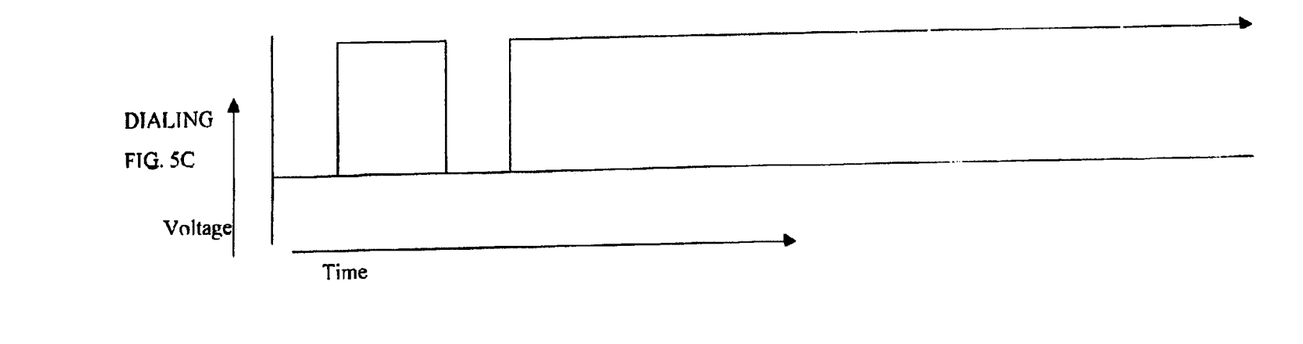

If the active state is the result of an incoming call being answered, the stamp 124 detects a pattern similar to FIG. 5B, and the "A" (answer/off hook) sensor 122-2 goes high and remains high until the telephone call is over. If the "A" (answer/off hook) sensor 122-2 is high because of an outgoing call, the stamp 124 detects a pattern similar to FIG. 5C. As FIG. 5C illustrates, a brief pause in the flow of current through the "A" (answer/off hook) sensor 122-2 is recognized. After the brief pause, the current will resume to flow and continue to flow until a time out occurs. A time-out is defined as a condition in which the phone company has determined that the phone 110 has been off the hook for a predetermined period of time and no valid phone number has been entered. When this occurs, the phone company may interrupt the calling process with a message instructing the caller to please hang-up and try again. In this embodiment, such message is termed the "time out message."

When the stamp 124 detects a high on the "A" (answer/off hook) sensor 122-2 pin, it briefly polls both the "A" (answer/off hook) sensor 122-2 and "R" (ring) sensor 122-1 for status. If a high on the "R" (ring) sensor 122-1 is detected, a ring-flag is changed from "0" to "1" in the software. The stamp 124 likewise changes the call-flag from "0" to "1" if the high on the "A" (answer/off hook) sensor pin is briefly interrupted. The stamp 124 continues the polling process until it no longer detects a high on the "R" (ring) sensor 122-1 during a polling cycle. Upon detecting a high on the ring sensor, the stamp 124 will restart the polling cycle. Once the ringing stops, or if no ringing is detected within a polling cycle, the stamp 124 polls the "A" (answer/off hook) sensor 122-2 to determine the "call-flag" status. If the call-flag has a value of "1", and the ring-flag has a value of "0", and the "A" sensor is high, then the stamp 124 recognizes that the call is outgoing. If the ring-flag has a value of "1" and the call-flag has a value of "0", and the "A" sensor is high, then the stamp 124 recognizes that the call is an answered incoming call. For a summary, see Table 1 below.

TABLE 1

| Ring-Flag | Call-Flag | Answer/Off Hook Sensor Status | Meaning |
| --- | --- | --- | --- |
| 1 | 0 | Low | Phone Ringed But Not Answered |
| 1 | 0 | High | Answer Incoming Call |
| 0 | 1 | High | Outgoing Call |
| 1 | 1 | High/Low | Phone is Ring |

The stamp 124 considers the "A" (answer/off hook) pin going low and remains low at the completion of an active event. The stamp 124 resets itself and goes back to polling the phone line for activity. In one embodiment, the "A" (answer/off hook) pin goes low and remains low once the call is completed and the phone is placed back on the hook.

If an outgoing call is being made, the router 120 will determine the nature of the call by looking, for example, for a "1" in the first position of the phone number being dialed. The absence of a "1," unless discounted local service is available, places the router 120 in a passive mode, and allows the phone call to occur but not to perform its routing function. The presence of a "1" in the first position of the phone number being dialed triggers the router 120 into performing its specialized function (routing the call) as described more fully below. Other series of numbers may be used to trigger router 120. For example, the router 120 may be configured to trigger all calls beginning with "011", or all eleven digit telephone numbers beginning with "1" less 1800, 1888, telephone numbers and the like, or all "9011", or "91" twelve digit phone numbers (usually dialed to gain long distance or international access in settings such as offices or hotels).

Long Distance Call Detection and Router Response Process

Although the system and methods may be configured for all types of telephone service, the process of detecting and routing long distance calls will now be described Referring back to FIG. 3, once an outgoing telephone call is detected in step 315, stamp program determines whether the outgoing telephone call being placed is a long distance call. It should be noted that when an off-hook condition exists but the call is not an outgoing call, the monitoring process for an outgoing call is restarted at the end of the off-hook condition (step 320).

In step 321, the stamp 124 and DTMF decoder 126 determine whether a DTMF tone is detected prior to a time out condition (step 319). In one embodiment, whenever a time out condition is detected, the relays are released (step 334) and the process restarts once the phone is on hook (step 335).

If time-out has not occurred, the stamp 124 will start counting the DTMF signal detected. With each detected DTMF signal, the count is advanced. A determination is then made in step 323 as to whether the number of DTMF tones detected is greater than one. If the count is not greater than 1 (step 323), the stamp 124 advances the system to determine if the first DTMF is equal to one (step 325). The detected DTMF is then stored in memory and the process returns to step 319 (checking for a time-out and new DTMF signal). If the first DTMF is equal to 1, the stamp 124 isolates the phone from the outside world (step 327) and sets the L-flag from "0" to "1" (long distance flag to true) (step 329). The stamp 124 returns the process back to step 319 (checking for a time-out and new DTMF signal).

If the number of detected/stored DTMF signals is greater than one (step 325) and no long distance call is indicated (step 336), the router 120 waits until the phone is on the hook (step 375) before monitoring the phone line again (step 305-310).

The presence of a "1" in the first, or in a predetermined position of the phone number being dialed informs the router 120 that the call is a long distance call. In one embodiment, the router 120 will be monitoring the first position of the dialed telephone number. When the router's microprocessor detects a "1" in the first position of the phone number being dialed, the router 120 assumes an active mode. In the active mode, the router 120 activates relay 3 (130-3) and de-activates relay 1 (130-1), effectuating the isolation of the telephone 110 from the outside world. The internal power source needed to keep the phone 110 functioning is also turned on. The phone 110 uses the power to run its internal DTMF generator enabling the caller to dial their desired phone number.

The DTMF transceiver attached to the telephone line, along the alternate path created by relay 1 (130-1) and relay 2 (130-2) activation (FIG. 2 between 122-1 and 122-2), captures all dialed DTMF digits and pass them on to the microprocessor. The telephone numbers dialed by the user are captured and stored in the microprocessor RAM memory. While the dialed phone number is being captured, the microprocessor is periodically monitoring the "T" (time out) sensor. Once the microprocessor has captured the required number of DTMF digits to initiate the call it will check the first four digits. The first four digits will tell the router 120 if it should route the call to a discount carrier.

If the caller has dialed a special number such as 1(888), 1(800), 1(900),or 1(600) the router coding effectuates the dialing of the "balance" of the phone number that the user entered and then releases the relays 130. Releasing the relay will reconnect the telephone 110 to the outside world. The term "balance" refers to the condition in which a "1" was dialed before the telephone was isolated from the outside world. Therefore, to complete the call, the router 120 will only have to dial all the entered DTMF digits except the first "1". If the caller did not dial a special phone number, the router dials the "modify balance" of the number and releases the relays 130. In "modify balance" of the number, refers to the condition in which a "1" was already dialed before the telephone was isolated from the outside world. In "modify balance" mode, the router 120 dials the discount number without including the starting "1" when dialing the customer long distance number: for example, 1010-321 1(201)123-1234 would be 010-321 1(201)123-1234; and 1(800)7654321 would be 8007654321. If the long distance carrier requires an access code, the router 120 provides such code. The router 120 waits for the "A" (answer/off hook) sensor pin to go low and remain low before concluding that the call is over, and returns to monitoring the phone line for activity. It should be noted that the router 120 may be reconfigured/programmed such that any individual or series of digits and/or any predetermined positioning of such digit may trigger the discount long distance call placing process. For example, if the router 120 is being used in an office building, hotel or some other location where a "9" is dialed prior to placing outside call, the router 120 may be set (i.e., via a switch access by the user) so that the second position digit is detected for the number "1". If in the process of capturing the long distance telephone number being dialed by the user the "T" (time out) sensor 122-3 should go low (indicating the call can not be completed), the router's microprocessor releases the relays 130 allowing the user to hear the time out message. The microprocessor then waits until the "A" (answer/off hook) sensor 122-2 goes low before resetting the system and monitoring the telephone line for activity.

Figure 3B:
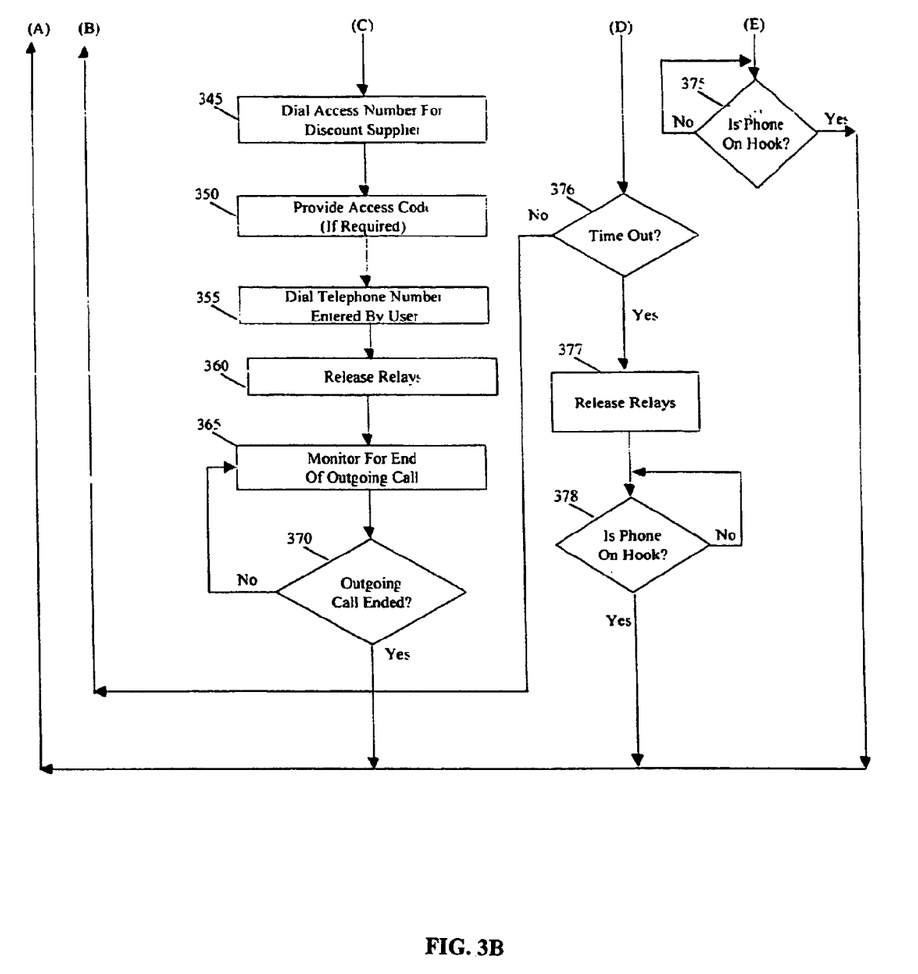

Returning to FIG. 3, if in step 336, a long distance call is indicated, DTMF tones are stored in memory (step 338) and a determination is made as to whether all of the numbers have been captured (step 342). If all of the numbers have not been captured, a determination is made as to whether a time-out condition has occurred (step 376). If such a condition has not occurred, the router 120 resumes detecting and collecting DTMF signals (step 319). If a time-out condition is sense in step 376, the relays are released (step 377) and the router 120 waits for an on hook condition (step 378) which restarts monitoring of the phone line (steps 305-310).

Discount Long Distance Call Placing Process

If long distance call has been detected (step 336) and all of the numbers have been captured (step 342), router 120 dials the access number for the discount supplier (step 345), provides the access code (if required) (step 350) and dials the telephone number entered by the user (step 355). The relays are then released (step 360), reconnecting the telephone 110 to the outside world allowing communication to occur. An end of call condition is then monitored (steps 365 and 370) upon which the router 120 returns to monitoring of the phone line (steps 305-310).

In certain cases, such as when the telephone user is accessing its dial around service from home, the access code may not be required by the discount long distance carrier. In those cases, the access code is not provided. The appropriate number and code may be, in one embodiment, chosen from a plurality of such numbers and codes in accordance with a predetermined protocol. For example, software may enable router 120 to choose a certain access number/code when such number/code is the most cost-efficient. In another embodiment, the stored access numbers/codes may be utilized on a rotating basis so that the subscribing long distance companies can benefit equally from use of its service while the customer continues to recognize savings associated with the discounted services.

Again, it should be noted that router 120 may be reconfigured such that any individual or series of digits and/or any predetermined positioning of such digits may trigger the discount long distance call placing process. For example, the router 120 may be programmed such that if the DTMF encoder/decoder chip 126 of router 120 senses that the first three number are "011" (or first four numbers are "9011" where "9" is required for an outside line), then an international call is being made. Accordingly, router 120 may be programmed with the appropriate discount international call access numbers in order to apply discounted rates to these calls as well. Once the predetermined sensing is accomplished, the discount long distance call placing process may be effectuated.

Discount Long Distance/International Call Dialing Process

Figure 4A:
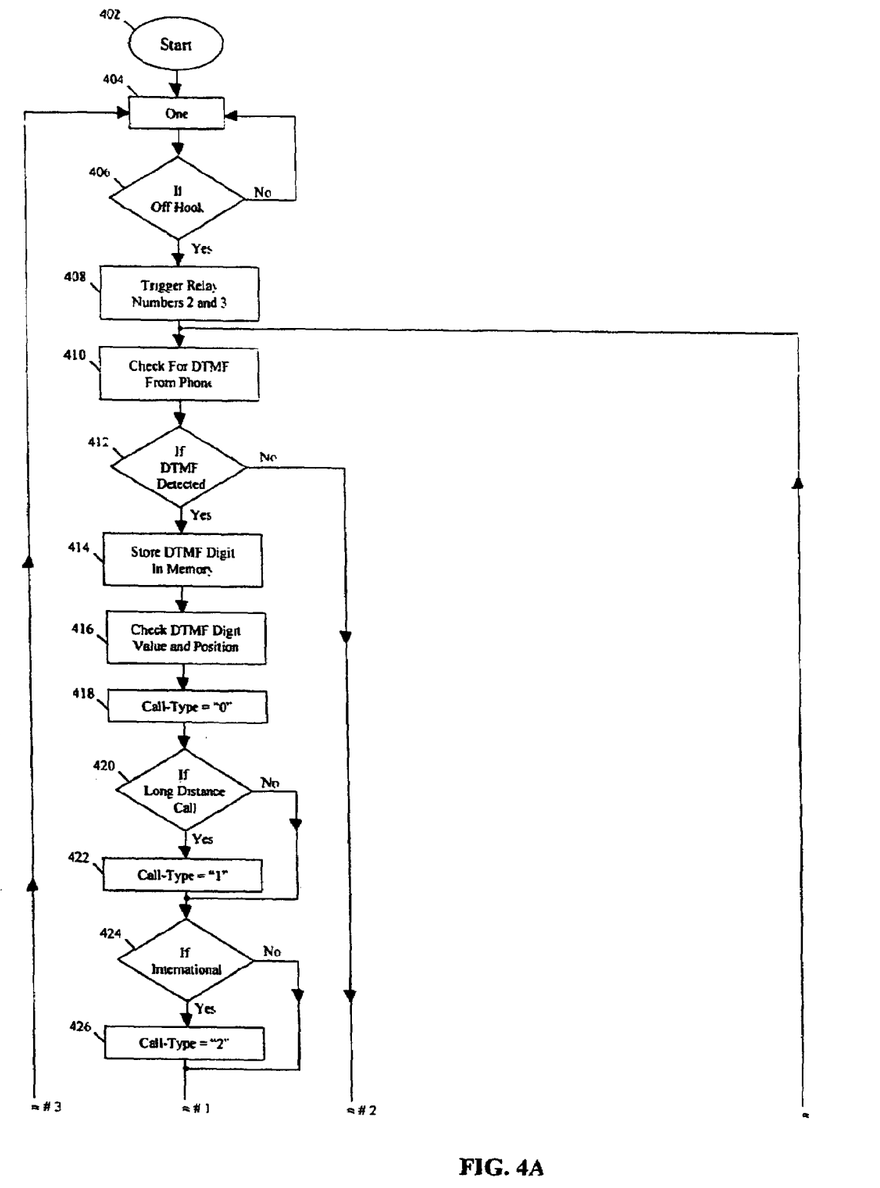
FIGS. 4A and 4B are flowcharts showing an alternate embodiment of the telephone line monitoring, discount call detection and call completion process performed by the router shown in FIG. 2.
Figure 4B:
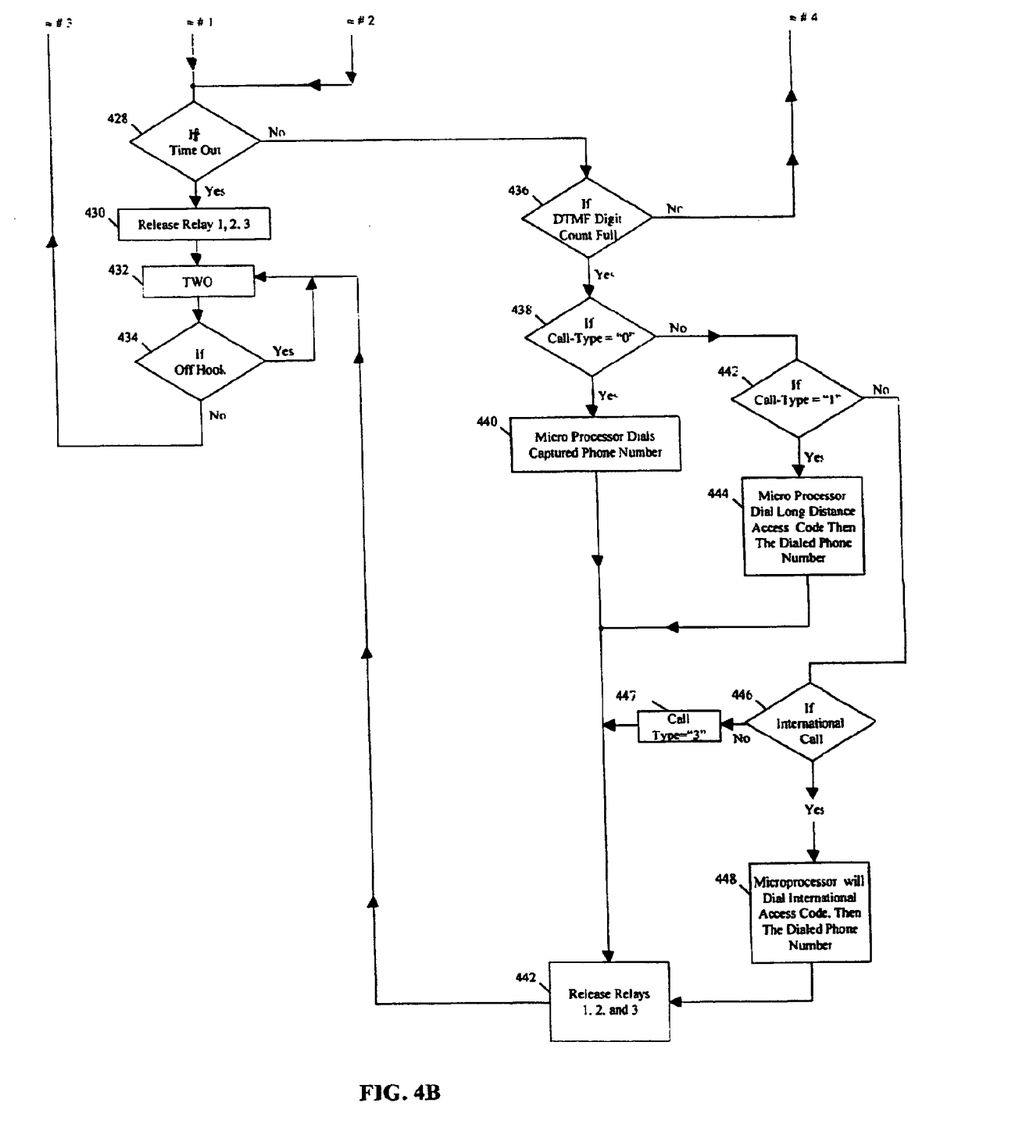

FIG. 3A and 3B illustrate an embodiment of the present invention for primarily making long distance calls recognizing that the process may include dialing international and local calls. The process described with respect to FIGS. 4A and 4B illustrate an alternate process of effectuating discount long distance and international calls.

In step 402, the process is initiated. In step 406, the router 120 determines whether the telephone 110 is in an off hook condition. If the telephone 110 is experiencing such a condition, relays R2 and R3 are triggered together, isolating the telephone 110 from the outside world. The DTMF decoder 126 monitors whether DTMF signal are detected from the telephone 110 (steps 410 and 412). If DTMF signals are detected, they are stored in memory of the stamp 124 (step 414).

In step 416, the DTMF value and positions are analyzed by the microprocessor. This is done to determine the type of call that is being placed. For example, if the first digit is a "1", a long distance call (call type=1) is being placed. If the first digits are "011", an international call (call type=2) is being placed. If the first digits are "*69", "1800", "1888", or some other preprogrammed special prefix, then the call is classified under the "other" category (call type=3). Most of the remaining calls are local calls (call type=0). The type of call is determined in steps 418-426.

In step 428, a determination is made as to whether a time-out condition has occurred. As described above, if the appropriate number of digits is not captured (or some other problem occurs) within the parameters of the polling protocol, a time-out occurs, the line is released (i.e., user accesses the outside world and hears the time out message).

If no time-out condition occurs, the automatic router 120 checks to see if the DTMF digit count is full (step 436). If it is not full, the process returns to step 410 and awaits further DTMF tones from the telephone 110.

If the DTMF digit count is full, a determination is made as to whether the call is a local call (call type=0) (step 438), a long distance call (call type=1) (step 442), an international (call type=2) or other (call type=3) type of call (step 446). This determination is made by analyzing the beginning DTMFs of a dialed telephone number as described in detail above.

If the call is a local call, the microprocessor 124 dials the captured telephone number in step 440 and relays 130 are released (step 442). If the call is a long distance telephone call, microprocessor 124 dials the long distance access code and the dialed telephone number (step 444) and relays 130 are released (step 442). If the call is an international call, the microprocessor 124 dials the international access code and the number dialed (step 448) and then relays 130 are released (step 442). Finally, if the call being placed is not a local, long distance or international call, automatic router 120 treats the call as meeting the "other" category. Accordingly, the microprocessor 124 dials the captured numbers and the relays are released.

The phone line is then monitored for the end of the call (step 432). Once the call has ended the process returns to the beginning (step 402).

Media Recording Access and Control Process

Figure 6:
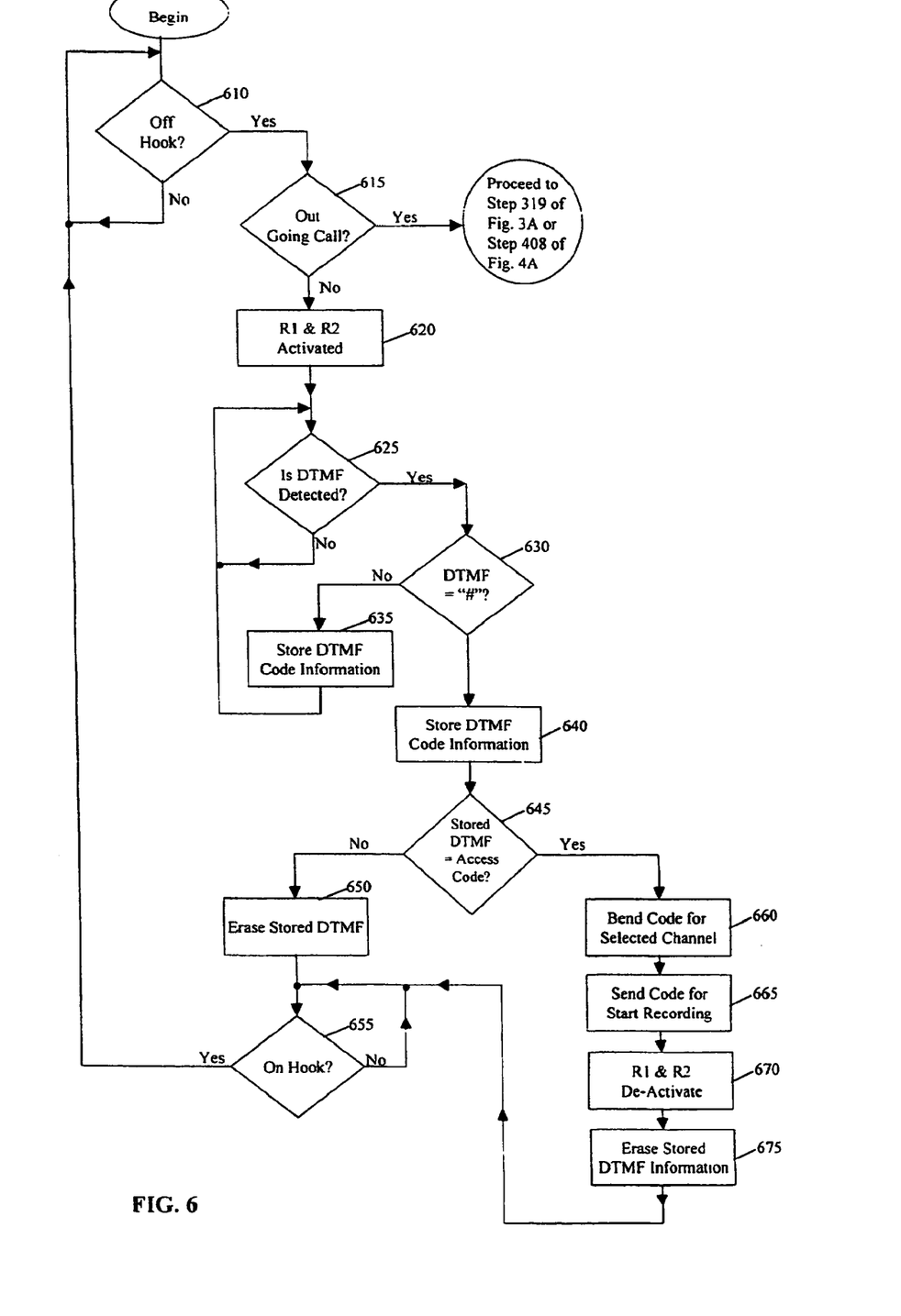
FIG. 6 is a flowchart showing the media recording access and control processes performed by the EA router shown in FIG. 2A.

FIG. 6 illustrates an embodiment of the present invention for accessing and controlling a recording device situated in a remote location. These processes are accomplished by EA router 120A and is described below with reference to FIGS. 2A and 6. The EA router 120A monitors a telephone line for activity, detects whether a potential activity on the phone line allows incoming instructions, captures such instructions and transmits them to an intended device.

As describe below, the EA router 120A is able to receive a string of DTMF tones and translate it into a series of digits. The received string of digits contains coded instructions for the EA router 120A. The instructions tell the EA router 120A how to generate signals that access and properly set the recording device to record a desired program. The user can communicate with their EA router 120A by keying in DTMF tones, supplying information over the internet or by voice commands over telephone to a central site. The central site converts the user's instructions into DTMF tone and transmits them to the user's EA router 120A. The EA router 120A may communicate with the user's recording device via a variety of methods such as light wave (infrared light) or electronic signals (analog or digital signals).

In one embodiment, for example, a request may be placed on a Sunday, to record a program that is aired at 9:30 PM on channel 7 Sunday night. At the central site, where the request is logged in, the user's file is located and checked for validity. If valid, the user's EA router access code, and model number information are retrieved from the user's record. This information is used to generate a numeric string that encodes the command instructions that are required to effectuate the recording. Since each manufacturer may use different remote control codes/pulses for a given digit or command, each user must register the type, brand, and model of their recording device in order to ensure that the EA router 120A can function properly. Panasonic, RCA and Toshiba VCRs, for example, may be encoded to start recording with a 123 cycle (c.p.s.) of duration 20 ms, 210 c.p.s. for 15 ms, and 30 c.p.s. for 50 ms, respectively. In this embodiment, pulses refer to the number of impulse (light/electrical) to be generated in one second. This difference in command coding makes it necessary for each user to register the make and model of their recording device.

In one embodiment, the central site validates the user's identity and collects information regarding the program the user wants to record: day of recording, time of the recording, channel from which to record the program. The central site then generates a string of DTMF tones that encodes the user's access code, channel from which the recording is to be made, the commands to activate the VCR, the commands for rewinding the tape, and the commands for start recording.

EA router 120A, in this embodiment, recognizes that the central site sends a string of DTMF tones in a predetermined format. This allows the EA router 120A to convert the captured DTMF tone sequence into a numeric string that can be segmented into both remote control command codes and access codes. The access codes allows the EA router 120A to recognize that the instructions come from an authorized VCR user. The command codes allows the EA router 120A to turn on the VCR, rewind the tape in the VCR, select the channel to record and then start recording.

In this embodiment, the central site sends the code out anywhere from 5 to 10 minutes before the desired recording time. This reduces the size and amount of coding required to be sent. In another embodiment, the string of DTMF tones sent to the EA router 120A contains coding information for selecting date and time. In other embodiments, the central site may allow interaction with the user's device directly.

In one embodiment, the instruction components may consist of two elements: number of pulses and duration of pulses. Each component may appear in a fixed position in the string and occupies a set number of spaces. If all the spaces are not required, the unneeded portion may be filled with zero(s) (e.g., 0020 is 20 ms).

In one embodiment, the password may be the first (9) nine digits of the decoded DTMF tone numeric string. The access code and the "End Of Data Flag" (#) components of the transmitted string of DTMF tones may not need a duration aspect.

The EA router 120A receives the number of pulses and the duration of a pulse in order to properly mimic a remote control device. Instructions may be transmitted from the central site in the form of code blocks. Each code block (CB) may consist of two distinct aspects: number of pulses and duration per pulse (in milliseconds (ms)).

In a CB, for example, the day of the week for which the recording is to be made is denoted by a single numeric character: Sunday, the first day of the week is "1" and Saturday, the last day of the week is a "7". A "0" can be used to indicate that the recording is to be made on the same day as the entry into the central site. The central site may indicate to the EA router 120A how the instruction codes are to be generated: as monotone or as dual tones (DTMF). If the code is to be generated in mono-tonal manner, the central site may indicate this with a "1" and a dual tone may be indicated with a "2". Further, the central site may use a 24 hours system time system, in which mid-night is 0000 and 1 pm is 1300. The central site may indicate the channel that is to be recorded as a three digit number: allowing for a range of 001 to 999.

The following are tables of codes that may be used in accordance with one embodiment.

| Code Key | Translation |
|---|---|
| 0 | If the recording is to be made on the same day as the entry is made into the central site |
| 1 | Recording is to be made on Sunday |
| 2 | Recording is to be made on Monday |
| 3 | Recording is to be made on Tuesday |
| 4 | Recording is to be made on Wednesday |
| 5 | Recording is to be made on Thursday |
| 6 | Recording is to be made on Friday |
| 7 | Recording is to be made on Saturday |
| 1 | Mono-tonal code generation format, instruction codes for controlling the recording device may be generated by the EA router combining the number of impulses and a duration of the impulses. |
| 2 | Dual tonal code generation format, instruction codes for controlling the recording device may be generated by combining two different tones to generate a unique new tone (DTMF). |
| 0000 | The start of the day at midnight |
| \| | |
| 1200 | Twelve noon |
| \| | |
| 1300 | One in the afternoon |
| \| | |
| 2359 | One minute before midnight |
| \| | |
| 999 | The channel can range from 1 to 999, channel 7 is 007. |

-continued

| Code Key | Translation |
|---|---|
| ABCD | The number of cycles per second to instruct the recording device to turn on. |
| EFGH | The duration of which the pulses should be transmitted to activate the recording device. Both ABCD & EFGH may be require to mimic the Remote control activation of the recording device. |
| PQRS | The number of cycles per second to instruct the recording device to start recording. |
| TUVW | The duration of which the pulses should be transmitted to start recording. |

Both PQRS & TUVW may be required to mimic the Remote control device to start recording instruction. The cycle duration of both instructions (activate and record) may be the same or different, depending of the recording device manufacture.

In one embodiment, the following string of DTMF tones may be transmitted to the EA router 120A. The position and length of each component of the encoded instructions to the recording device is preset, allowing the EA router 120A to easily convert the central site transmitted data string into an access code, instructions codes that mimic the recording device remote control unit, and a termination flag.

123456789DFTTTT 9999 8888 ABCD EFGH ANMY RETW PQRS TUVW #

123456789012130 0134 0020 0020 0050 0170 0020 0150 0020 #

In one embodiment, the above numeric string of digits may be converted into a string of DTMF tones. A DTMF encoder converts each digit into a distinct DTMF tone. The DTMF tone is transmitted to the EA router 120A. The EA router 120A then converts the DTMF tones back into digits that can be translated into instructions, access code information and an end of data flag.

POSITION TABLE
123456789DFTTTT ABCD EFGH ANMY RETW PQRS TUVW #

| Segment | Contents | Position |
|---|---|---|
| 123456789 | Access Code | (1-9) |
| D | Day Of Recording | (10) |
| F | Format To Use In Creating Control Codes | (11) |
| TTTT | Time Of Day To Start Recording | (12-15) |
| 9999 | Number Of Pulses In Channel Select Command | (16-19) |
| 8888 | Duration Of The Channel Command | (20-23) |
| ABCD | Number Of Pulses In VCR Activate Command | (27-31) |
| EFGH | Duration Of The Activate Command | (32-35) |
| ANMY | Number Of Pulses In VCR Rewind Command | (36-39) |
| RETW | Duration Of The Rewind Command | (40-43) |
| PQRS | Number Of Pulses In VCR Record Command | (44-47) |
| TUVW | Duration Of The Record Command | (48-51) |
| # | End Of Data Flag | Always Last |

CONTENT TABLE
123456789012130013400200020005001700020015000020#

| Segment | Contents | What It Contains |
|---|---|---|
| 123456789 | Access Code | 123456789 |
| 0 | Day Of Recording | Today |
| 1 | Mono Tone Format | Single Tone |
| 2130 | Time Of Day To Start Recording | 9:30 PM |
| 0134 | Number Of Pulses In Channel 7 Command | 134 pulses |
| 0020 | Duration Of The Channel Command | 20 ms |
| 0020 | Number Of Pulses In VCR Activate Command | 20 pulses |
| 0050 | Duration Of The Activate Command | 50 ms |
| 0170 | Number Of Pulses In VCR Rewind Command | 170 pulses |
| 0020 | Duration Of The Rewind Command | 20 ms |
| 0150 | Number Of Pulses In VCR Record Command | 150 pulses |
| 0020 | Duration Of The Record Command | 20 ms |
| # | End Of Data Flag | # |

As shown in FIG. 2A and explained above, the EA router 120A may receive a string of DTMF tones from the central site and convert them into light signals that may be communicated to the recording device via the infrared emitter 192 (FIG. 2A) attached to the stamp/micro-controller 124. An EA router user may enter information about what programs are to be recorded via the internet, wire/wireless phone, fax, etc.

In one embodiment the string of DTMF tones that originate from the central site is generated in the following manner. The user, using the internet, for example, logs into the central site web page and uses a graphical user interface to enter their username and password. The central site checks to ensure that the user is valid. All valid users have registered their EA router 120A, the phone number to which the EA router 120A is attached, brand and model number of their recording device.

In one embodiment the user may enter the day of the week for which they want to record, the time of day that they want to start recording and the channel that they want to record. The central site generates a string of DTMF tones that encodes this information as shown in the tables above. In one embodiment, the registered EA router's access code may be attached to the beginning of the encoded information, and the end of data flag (#) may be attached to the end of the encoded information. This allows the EA router 120A to determine if the incoming string of DTMF tones should be accepted. The end of data flag tells the EA router 120A that all of the sent information has been received, and that it can now proceed with process the string of DTMF tones.

In another embodiment, the EA router 120A user may communicate the user password name, and the pertinent recording information (day, time and channel) for recording a desired program via the phone either by voice response technology or by using the keypad to respond to options heard over the phone. Once the central site has gathered all of the required information, it generates a string of DTMF tones that contains instructions for creating commands that causes the user recording device to record a specific program.

The central site generates a string of DTMF tones that encodes this information as shown above. In one embodiment the registered EA router's access code is attached to the beginning of the encoded information, and the end of data flag (#) is attached to the end of the encoded information. The access code allows the EA router 120A to determine if the captured string of DTMF-tones should be accepted. The end of data flag tells the EA router 120A when the end of the string of DTMF tones is reached, and that it can now begin to process the string into code signals that will mimic a remote control unit.

At step 610, a determination is made as to whether telephone 110 is in an off-hook condition. If it is not, then the EA router 120A awaits such a condition. Once an off-hook condition is established, the micro-controller/stamp 124 may determine whether an outgoing or incoming call is being made (step 615). If the call being made is outgoing, the system and method proceed to 319 of FIG. 3A or step 408 of FIG. 4A (depending on the call type as described above).

The EA router 120A may detect an incoming call in using the method described above. When both an incoming call and off-hook status are detected, the EA router 120A may activate Relay 1 (R1) and Relay 2 (R2). Activation of R1 and R2 (step 620) in this embodiment enables the EA router 120A to detect any DTMF tones that may be transmitted on the incoming phone line (step 625).

If no DTMF tones are detected on the incoming line, the system will continue to await for such tones until the call is terminated. If a string of DTMF tones are detected on the incoming line, the system captures the DTMF tones one by one and converts them into digits using a DTMF decoder. Captured digit(s) are evaluated and then stored in an array (step 635 and step 640). The process of monitoring the incoming line for DTMF tones continues until one of the captured DTMF tones is a "#": the end of data flag (step 630).

Once the end of data flag is detected "#", the system stores the flag (step 640) and begins to process the captured string of DTMF-tones in the manner indicated above. The system checks the first nine (9) digits to see if they form a valid access code: the access code specific to that EA router 120A (step 645). If this access code does not match the access code stored in the EA router 120A, the entire stored string of digits is erased (step 650). After erasing the digits stored in the array, the system awaits the end of the call (step 655).

If the first nine digits matches the access code stored in the EA router 120A, the system processes the balance of the string of digits in the above-indicated manner. In this embodiment, the digits are converted into code signals that are transmitted by infrared light to the recording device. In one embodiment, the sequence of codes follows an order that allows the recording device to know which channel to record (step 660) and when to start recording (step 665). After the EA router 120A has started the recording process, it erases the stored string of digits (step 675) and deactivates R1 and R2 (step 670). The system then awaits the end of the call (step 655) before resetting itself.

In this embodiment, once the string of digits is converted into valid code signal that the recording device recognizes, the instruction codes are transmitted to the recording device. The transmission mode may be in the form of infrared light impulses generated by the infrared diode/transmitter attached to the EA router 120A (FIG. 2A) and received by the recording device infrared detector.

In another embodiment, once the string of digits is converted into valid code signal that the recording device recognizes, the instruction codes are transmitted to the recording device. The transmission mode may be in the form a direct electrical line between the two devices (EA-Router and Recording Device). The instructions may go directly to a microprocessor/micro-controller inside of recording device. This may obviate the need for an infrared light sensor in the recording device, and permit greater flexibility in the control of the user's recording device.

In another embodiment, the recording device remote control may transmit instructions to the recorder in a dual tone (DTMF) format. The transmitted string of digits (CB) sent from the central site may contain an indicator telling the EA router 120A that the instruction codes are to be generated by combining two distinct tones. A dual tone CB may consist of paired tones ("A" and "B") and may not have or need a duration aspect. The system then retrieves the digits from the tone stream (CB) and convert them into a string of digits that may be used to create specific paired groups of tones. These tones may be combined by the system to form DTMF signals that the recording device would recognize. These signals may be transmitted to the recording device by infrared light or electrical impulses over a wire. In this embodiment the paired tones are indicate below as "A" and "B", and when "A" and "B" are combined, they produce a unique byproduct/signal.

POSITION TABLE
123456789DFTTTT ABCD EFGH ANMY RETW PQRS TUVW #

| Segment | What It Contents | Position |
| --- | --- | --- |
| 123456789 | Access Code | (1-9) |
| D | Day Of Recording | (10) |
| F | Format To Use In Creating Control Codes | (11) |
| TTTT | Time Of Day To Start Recording | (12-15) |
| 9999 | Pulses/second (A) In Channel Select Command | (16-19) |
| 8888 | Pulses/second (B) In Channel Select Command | (20-23) |
| ABCD | Pulses/second (A) In VCR Activate Command | (27-31) |
| EFGH | Pulses/second (B) In VCR Activate Command | (32-35) |
| ANMY | Pulses/second (A) In VCR Rewind Command | (36-39) |
| RETW | Pulses/second (B) In VCR Rewind Command | (40-43) |
| PQRS | Pulses/second (A) In VCR Record Command | (44-47) |
| TUVW | Pulses/second (B) In VCR Record Command | (48-51) |
| # | End Of Data Flag | Always Last |

CONTENT TABLE
123456789012130013403200190015001700200015001 80#

| Segment | Contents | What It Contains |
| --- | --- | --- |
| 123456789 | Access Code | 123456789 |
| 0 | Day Of Recording | Today |
| 1 | Mono Tone Format | Single Tone |
| 2130 | Time Of Day To Start Recording | 9:30 PM |
| 0134 | Pulses/second (A) In Channel Select Command | 134 pulses/sec. |
| 0320 | Pulses/second (B) In Channel Select Command | 320 pulses/sec |
| 0190 | Pulses/second (A) In VCR Activate Command | 190 pulses/sec. |
| 0150 | Pulses/second (B) In VCR Activate Command | 150 pulses/sec. |
| 0170 | Pulses/second (A) In VCR Rewind Command | 170 pulses/sec. |
| 0200 | Pulses/second (B) In VCR Rewind Command | 200 pulses/sec |
| 0150 | Pulses/second (A) In VCR Record Command | 150 pulses/sec. |
| 0180 | Pulses/second (B) In VCR Record Command | 180 pulses/sec. |
| # | End Of Data Flag | # |

It should be noted that the example above describes accessing a media recording device by a user over a telephone line. It should be noted that many other types of communication networks may be used including, but not limited to, the internet, cable networks, wireless networks, etc. Further, although the example above describes an infrared emitter 192 accessing a media recording device, the emitter 192 may be replaced with another type of emitter (i.e., infrared, ultra-violet, RF, electrical signals, blue tooth technology) and the activated device may be any device that can receive such a signal.

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended claims and their equivalents. In this context, equivalents means each and every implementation for carrying out the functions recited in the claims, even if not explicitly described herein.

The invention claimed is:

1. Computer readable medium having computer executable software code stored thereon, the code for controlling at least one remote electrical device via a communication system, comprising: (a) code for enabling a remotely located computer at a processing center to monitor a communication system for activity; (b) code for enabling a computer at a processing center to determine whether incoming data from a plurality of remoter input terminals contain instructions for controlling a device situated at a location remote to both the input terminal and the computer at the processing center; (c) code for enabling the computer at the processing center to accept, process, and store incoming instructions; (d) code for the computer at the process center to determine when to forward instructions collected from a remote input terminal to a targeted device at a location remote to both the input terminal and the computer at the processing center; (e) code for enabling the reception of instruction by targeted device that is remotely located to both the input terminal and the processing computer; (f) and said instructions being able to control the future behavior of said targeted device.

2. The computer-readable medium of claim 1, wherein the communication system can be cable, wired, wireless, satellite, Internet, or a combination of the above mentioned forms of communication.

3. The computer-readable medium of claim 2, wherein information from the input terminal contains instructions, a valid user id, identity of the targeted appliance, and location of appliance.

4. The computer-readable medium of claim 3, wherein the remote input terminal is an Internet access terminal with user interfacing.

5. The computer-readable medium of claim 4, wherein the user interfacing linked to a website on a central computer.

6. The computer-readable medium of claim 2, wherein the targeted device is an electrical appliance that is electronically continuous with an external receiver of the transmitted instructions.

7. The computer-readable medium of claim 2, wherein the receiver of the transmitted instructions is incorporated into the electrical device that is to be controlled.

8. A method for transmitting instructions to control the future behavior of a targeted electrical device at a remote location with commands inputted at a input terminal remote to a targeted electrical device via a remote processing center, the method comprising: (a) a plurality of remote information input terminals that can establish a temporary connection to a centrally located computer; (b) a central computer configured to accept, process, and store all information collected from a plurality of remote input terminals; (c) a central computer remote to both the targeted electrical device and the plurality of input terminal configured for determining whether information collected from any given remote input terminal contains a valid authorizing password; (d) a central computer remote to both the targeted electrical device and the input terminal configured for determining whether information collected from any remote input terminal contains instructions for controlling a targeted electrical device located at a remote location; (e) a central computer configured for processing and storing for future use information collected from a plurality of remote input terminals; (f) a central computer configured to transmit instructions derived from processing information from a plurality of input terminals to a receiving device at a targeted remote location; (g) a receiving device able to convey received instructions to a target electrical device at a location remote to both the plurality of input terminals and the central computer; and said instructions from the central computer able to affect the future behavior of the targeted electrical device in accordance with the information entered at the remote input terminal.

9. The method according to claim 8, wherein the information from the input terminal containing instructions, a valid user id, and targeted device id.

10. The method according to claim 8, wherein the remote input terminal can be an Internet accessing device, phone, wireless device, or fax.

11. The method according to claim 8, wherein the receiver of the transmitted instructions is incorporated into the device that is to be controlled.

12. The method according to claim 8, wherein the receiving device of the transmitted instructions is external to the device that is to be controlled.

13. The method according to claim 12, wherein the receiver of the transmitted instructions relays said instructions to the targeted device by Blue Tooth technology or Radio Frequency.

14. The method according to claim 12, wherein the receiver of the transmitted instructions relays said instructions to the targeted device by Infrared or Ultra Violet Light Technology.

15. A system for controlling a targeted electrical appliance at a location remote to both an input terminal and a central processing center able to communicate time delayed instruction from the input terminal to the targeted electrical appliance, comprising: a communication system to transmit instructions from an input terminal to the targeted appliance via processing at a central computer; and wherein a receiving device at the site of the targeted electrical appliance able to conveys time delay processed instructions from the central computer to the targeted electrical appliance.

16. The system according to claim 15, comprising: a means for a targeted electrical appliance at a remote location possessing both memory for storing computer executable instructions and a microprocessor able to receive instructions via a communication system from a source external to the electrical appliance at a remote location.

17. The system according to claim 16, further comprising: a mean for using an Internet access terminal with Graphic User Interface, a wireless device that transmit voice commands, a wireless device that transmit DTMF tones, a wired telephone that transmit DTMF tones, wired telephone that transmit voice commands, or a fax machine as a input terminal to send information to the central computer.

18. The system according to claim 17, further comprising: a mean for the central computer to determines whether a remote input terminal has established connection for the purpose of transmitting information to said central computer for processing, storage, and re-transmittal to a targeted appliance at a remote location.

19. The system according to claim 18, further comprising: a mean for a central computer to establish contact with the remote location and transmit instructions to the targeted appliance; and control said appliance behavior based on said instructions.

20. The system according to claim 19, further comprising: a mean for a device that receives the instruction being attached to the targeted appliance, located within the targeted appliance, or otherwise in communication with the targeted appliance.

21. The system according to claim 20, further comprising: a mean for the receiver of the transmitted instructions conveying said instructions to the targeted appliance by Infrared, Ultra-Violet, Radio Frequency, Electrical Signals, or Blue Tooth Technology.

* * * * *